United States Patent [19]

Kapsambelis

[11] 3,783,244

[45] Jan. 1, 1974

[54] GAUGED PULSE WIDTH DETERMINING CIRCUIT

[75] Inventor: Christos Basil Kapsambelis, Canton, Mass.

[73] Assignee: Computer Identics Corporation, Westwood, Mass.

[22] Filed: Aug. 2, 1971

[21] Appl. No.: 168,043

[52] U.S. Cl. 235/61.11 E, 250/219 D, 340/146.3 Z

[51] Int. Cl. .............................................. G06k 7/14

[58] Field of Search .............. 235/61.11 E, 61.11 D, 235/61.7 R, 92 PE, 92 CA, 92 DN; 340/146.3 C, 172.5, 174 GA

[56] References Cited

UNITED STATES PATENTS

| | | | |
|---|---|---|---|
| 3,701,097 | 10/1972 | Wolff | 235/61.11 E X |
| 3,496,542 | 2/1970 | Rabinow | 340/146.3 MA |
| 3,522,586 | 8/1970 | Kiji et al. | 340/146.3 MA |
| 3,701,886 | 10/1972 | Jones | 235/61.11 E |
| 3,304,542 | 2/1967 | Sutton et al. | 340/172.5 |
| 3,509,535 | 4/1970 | Berube | 340/146.3 C |
| 3,744,026 | 7/1973 | Wolff | 235/61.11 E X |

*Primary Examiner*—Thomas J. Sloyan
*Attorney*—Joseph S. Iandiorio et al.

[57] ABSTRACT

In an automatic identification system for reading a remote label containing information in the form of a plurality of vertically arrayed horizontal stripes which may include wide stripes and narrow stripes, a stripe width determining circuit which detects a stripe of known absolute width, measures the relative width of the stripe of known absolute width, stores a representation of the relative size of the stripe of known absolute width, measures the relative width of each of the other stripes, and compares the relative width of the stripe of known absolute width with the relative width of each of the other stripes to determine the absolute width of each of the other stripes.

5 Claims, 4 Drawing Figures

Christos B. Kapsambelis
INVENTOR.
BY
Joseph S. Iandiorio
ATTORNEY.

Christos B. Kapsambelis
INVENTOR.
BY
Joseph S. Iandiorio
ATTORNEY.

Christos B. Kapsambelis
INVENTOR.
BY
Joseph S. Iandiorio
ATTORNEY.

GAUGED PULSE WIDTH DETERMINING CIRCUIT

FIELD OF INVENTION

This invention relates to a size determining circuit for determining the size of sections of information read remotely by an automatic reading system, and more particularly to such a circuit in which the relative size of each section is compared with the relative size of a section of known absolute size to determine its absolute size.

BACKGROUND OF INVENTION

In one conventional mark sensing system similar to that adopted by the Association of American Railroads (AAR) described in U.S. Pat. No. 3,225,177, F. H. Stites et al., a label is used having thirteen sections of information referred to as stripes. Each stripe may include one or two items or bands and each band may be colored red, blue, or white (which is read as red and blue). Each stripe contains a first band and may or may not include a second band. If the second band is not used then its band area is colored black. Those that contain both bands are referred to as wide stripes; those that contain only the one are referred to as narrow stripes. The first stripe is a start code and is always a wide stripe as is the twelfth stripe which is the stop code. The second through eleventh stripes contain other coded information and can be either wide or narrow as can the thirteenth stripe which is a parity stripe. Each stripe is spaced from the adjacent stripes by a black space approximately equal to the width of one band. When the stripe is a narrow stripe, however, the second band is black and so the space appears two bands wide.

In each stripe the first band may assume any one of three states as viewed by a scanner which includes a red sensor and a blue sensor: the first band may be red, blue or red and blue (white). The second band may be red, blue, red and blue (white) or neither red nor blue (black); the latter condition occurs when the band is not used and is replaced by an equal black area. The red signal and blue signal are sampled at a first predetermined time after the leading edge of the stripe is detected to test for the presence of red and of blue in the first band and at a second predetermined time after the leading edge to test for the presence of red and of blue in the second band. In order to assure the best results these two samples are generally set to occur in the middle of each band optimally spaced from the leading and trailing edge transitions. This requires that some fixed duration be assumed for the signals from the first and second bands. This assumption works well only so long as the object carrying the label and the scanner remain at the same distance from each other. For if the object moves farther away from the scanner, i.e. a labelled railroad car sways away from the scanner or the car is narrower than the average car, then the stripes and bands appear narrower, and conversely, if the object moves closer to the scanner, i.e. a railroad car sways toward the scanner or is wider than the average car, then the stripes and bands appear wider. If the stripes appear wider then the first and second bands may become so much smaller that the second band is not present at the time of the second sample and the system views the stripe as a narrow stripe.

Another sampling technique has provided for the first sample at a predetermined time after the leading edge of the stripe is sensed, as previously explained, but then delays the stripe signal a fixed period of time and samples that delayed stripe signal at a second sampling time derived from the trailing edge of the original stripe signal. The second sample is timed so that it occurs at a time when a second band would be present if a wide stripe has been scanned. However, here again the timing arrangement is designed with respect to an assumed band width which is generally but not always accurate. And again when the apparent stripe width varies at the scanner the system may erroneously judge a narrow stripe as a wide stripe or a wide stripe as a narrow stripe.

Both techniques determine whether the stripe is a wide or a narrow stripe by means of sampling at fixed times after a leading or trailing edge of a stripe, and so both are subject to error when the apparent stripe width varies more than a predetermined amount. Generally apparent or relative stripe widths of from one-half to twice the widths for which the sampling times are set are the limits of reliability of the system. Practically speaking the tolerance is even less because a portion of the pulse representing each band is unusable because of the unpredictable conditions that exist at the leading and trailing edge transitions. Thus a system whose optics are focused and whose sampling is aimed to operate at six feet may be able to read up to only eight feet before the decrease in apparent or relative stripe widths begins to cause errors.

SUMMARY OF INVENTION

It is therefore an object of this invention to provide means for determining the actual size of each section of information in a group of such sections given the apparent size of such sections when the actual size of one of such sections is known.

It is a further object of this invention to provide means for determining the actual size of a remotely read section of information whose apparent size may vary as a function of its position relative to the reading machine.

It is a further object of this invention to provide means for determining the actual width of each stripe in a group of stripes which may include wide stripes and narrow stripes, given the apparent width of each of such stripes, and the actual width of one of the stripes.

It is a further object of this invention to provide means for determining the actual width of each stripe in a group of stripes which may include wide stripes and narrow stripes, given the apparent width of each of such stripes, and the actual width of one of the stripes in terms compatible with the systems used by the A.A.R. and U.S. Pat. No. 3,225,177.

This invention features a size determining circuit for determining the actual size in a first dimension of each section of information in a group of such sections the actual size of one of which sections is known. There are means for detecting a section whose actual size is known in a first dimension and means responsive to the means for detecting for measuring the apparent size of the sections of known actual size. There are means for storing a representation of the apparent size of the section of known actual size and means for measuring the apparent size of each of the other sections. The apparent size of the section of known actual size is compared with the apparent size of each of the other sections to determine the actual sizes of each of the other sections.

In preferred embodiments the sections are embodied as wide and narrow stripes which are remotely read by an automatic reading machine, such as used in A.A.R. systems.

DISCLOSURE OF PREFERRED EMBODIMENT

Other objects, features and advantages will occur from the following description of a preferred embodiment and the accompanying drawings, in which.

Figure 1:
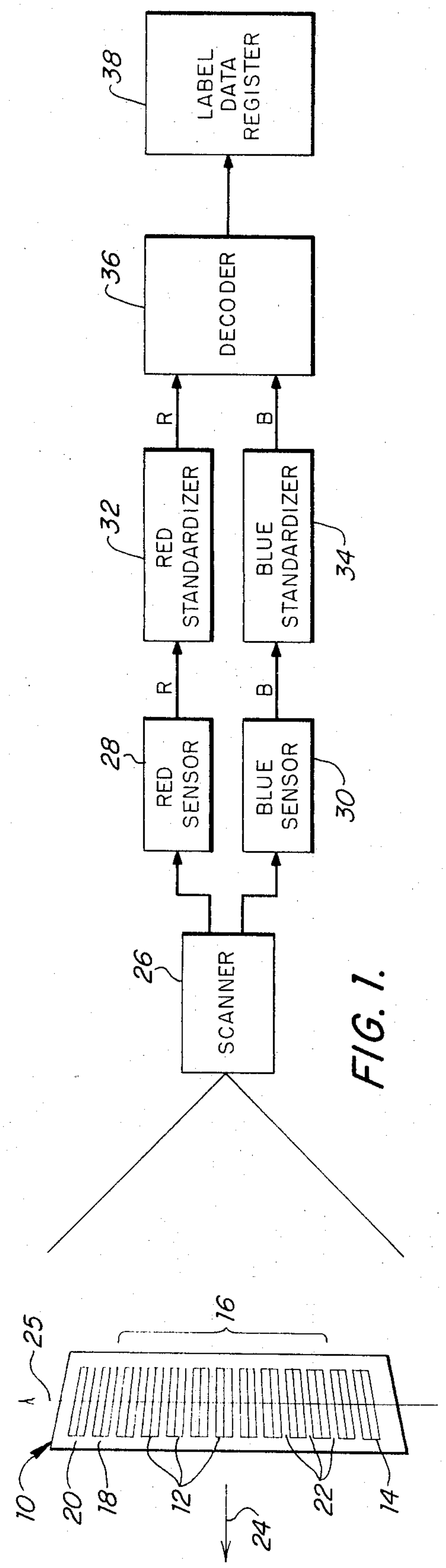
FIG. 1 is a block diagram of a system for scanning and interpreting the coded information in a label presently used by the A.A.R.

There is shown in FIG. 1 a mark sensing system typical of the type adopted for use by the A.A.R. which uses a label 10 including thirteen horizontal stripes 12, including a start stripe 14, ten data stripes 16, a stop stripe 18 and parity stripe 20. The start 14 and stop 18 stripes always include two bands: the rest of the stripes have a first band and may or may not have a second band depending upon whether or not the data they encode requires the second band. Each band of a stripe may be colored red, blue or white (red plus blue). If the stripe is a narrow stripe and the second band is not used then the second band is colored black (not red and not blue). Between each adjacent pair of stripes is a space 22 colored black which space is approximately the same width as a band. When a stripe is a narrow stripe and thus the second band is absent and colored black this area of no information (not red and not blue) is added to the original black space following that stripe in the direction of scanning.

As the label moves horizontally, arrow 24, it is scanned vertically from bottom to top, arrow 25, by scanner 26 which is usually spaced approximately 6 feet from the average position that the labels occupy as the railroad cars pass the scanner. At this range the scanner scans a 6 foot field at the plane of the label nd is capable of reliably reading the labels up to 8 feet away. Often the scanner is placed 9 feet away giving it a 9 foot vertical field at the label and making possible reading of a label up to 12 feet away. With the present invention a scanner at 6 feet can reliably read labels up to 12 and even 18 feet away and a scanner set at 9 feet can reliably read labels up to 18 or even 27 feet away.

From scanner 26 the light reflected from label 10 is submitted to a red sensor 28 and blue sensor 30. When a red or white band is scanned red sensor 28 has a red output; when a blue or black band is scanned it has a not-red output. Similarly, when a blue or white band is scanned blue sensor 30 has a blue output; when a red or black band is scanned it has a not-blue output. Since ambient conditions such as sunlight, dirty labels and the like cause the output pulses from sensors 28 and 30 to vary by a factor of as much as 50 or even one hundred to one, standardizers 32, 34 are used to resolve all incoming pulses to a standard signal wave form. The standardized red and blue pulses are then submitted to decoder 36 wherein it is determined whether each red pulse and blue pulse or lack of same occurs in a first band or a second band of the stripe scanned. This invention is concerned with a new means for making this determination. This determination is stored in a four-position storage so that the red and blue information of the first and second bands of a stripe which were scanned serially are now simultaneously present. The four bits of information are transferred upon a predetermined signal to label data register 38 which accumulates the four bits of each stripe until it contains the information extracted from all thirteen stripes in 13 separate four bit stages. This information is then passed on for further processing of the data.

Figure 2:
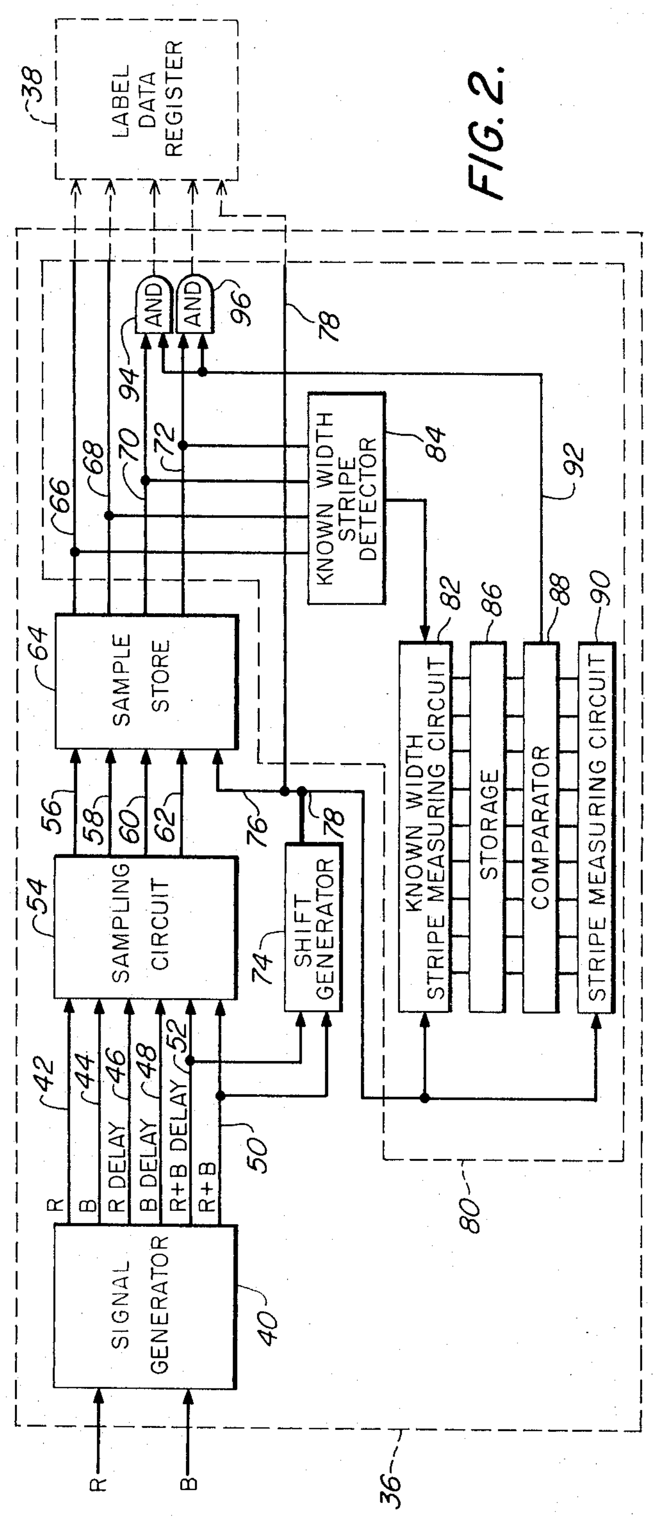
FIG. 2 is a block diagram of the decoder of FIG. 1 showing the major components of the decoder including the size determining circuit according to this invention.

Decoder 36, FIG. 2, includes a signal generator 40 which receives the red and blue signals from standardizers 32, 34 and provides red 42, blue 44, red delayed 46, blue delayed 48, red or blue 50, and red or blue delayed 52 signals to sampling circuit 54. The red 42 and the blue 44 signals are sampled by sampling circuit 54 in response to a signal derived from the leading edge of the red or blue delayed signal 52 to determine the content of the first band of a scanned stripe and the red delayed and blue signals are sampled at a second later time by a signal derived from the trailing edge of the red or blue signal 50. The four samples are delivered on four lines 56, 58, 60, 62 to sample store 64 where they are stored in four discrete locations.

Since in label 10 each stripe whether it be narrow or wide has a first band, the red and blue sample signals taken at the first sample time and stored in sample store 64 are always considered as valid information and so they are transferred directly to label data register 38 on lines 66, 68 with a proper shift pulse. However, since the second band is not always present, i.e. some stripes are narrow stripes, a determination must first be made as to whether a wide stripe or narrow stripe has been scanned. If it is determined that a wide stripe was scanned then the sample signals are permitted to be transferred on lines 70, 72 along with those on lines 66, 68 to label data register 38. However, if it is determined that a narrow stripe was scanned then the sample signals taken at the second sample time are prevented from entering label data register 38.

A shift generator 74 provides a reset signal on line 76 to sample store 64, a transfer signal on line 78 to introduce the data in sample store 64 to the label data register 38, and develops certain other timing signals which are delivered on line 78 to stripe size determination circuit 80. Shift generator 74 develops these signals from the red or blue 50 and the red or blue delay 52 signals from signal generator 40.

The determination of whether each stripe is a narrow stripe or a wide stripe is made by the stripe size determination circuit 80. If the comparator 88 determines that the stripe measured by stripe measuring circuit 90 is a narrow stripe there is no output on line 92 and if it indicates that the stripe measured by stripe measuring circuit 90 is a wide stripe then an output is provided on line 92 to enable AND circuits 94 and 96 to pass the samples on line 70 and 72 to label data register 38 so that a full stripe is transferred. Known width stripe detector 84 may be designed to recognize any particular stripe which regularly appears on label 10 and whose actual width is known. Thus it might recognize a particular narrow stripe in which case comparator 88 would determine that any stripe which is equal to or less than the measurement stored in storage 86 is a narrow stripe and anything greater than the measurement stored in storage 86 as a wide stripe. Alternatively, known width stripe detector 84 may be designed to detect a stripe which is known to occur in every label and which is a wide stripe. In that instance comparator 88 would be set to determine that any stripe measured by stripe measuring circuit 90 which is within a certain predetermined range of the size of the stripe measurement stored in storage 86 is a wide stripe and anything significantly less than that size is a narrow stripe. In a similar manner a size determining circuit such as stripe size determining circuit 80 may be used to determine the size of any section of information or any other type of indicia when the absolute size of at least one of the sections or indicia in a group of such sections or indicia is known and the apparent sizes of all such sections or indicia are known or can be measured by the machine. In addition any such determination need not be restricted to a simple determination of narrow or wide. Comparator 88 may be combined with a decoding circuit such that different ranges of comparison between the measurement stored in storage 86 and that present in stripe measuring circuit 90 may be recognized and a number of different sizes can be detected.

Figure 3:
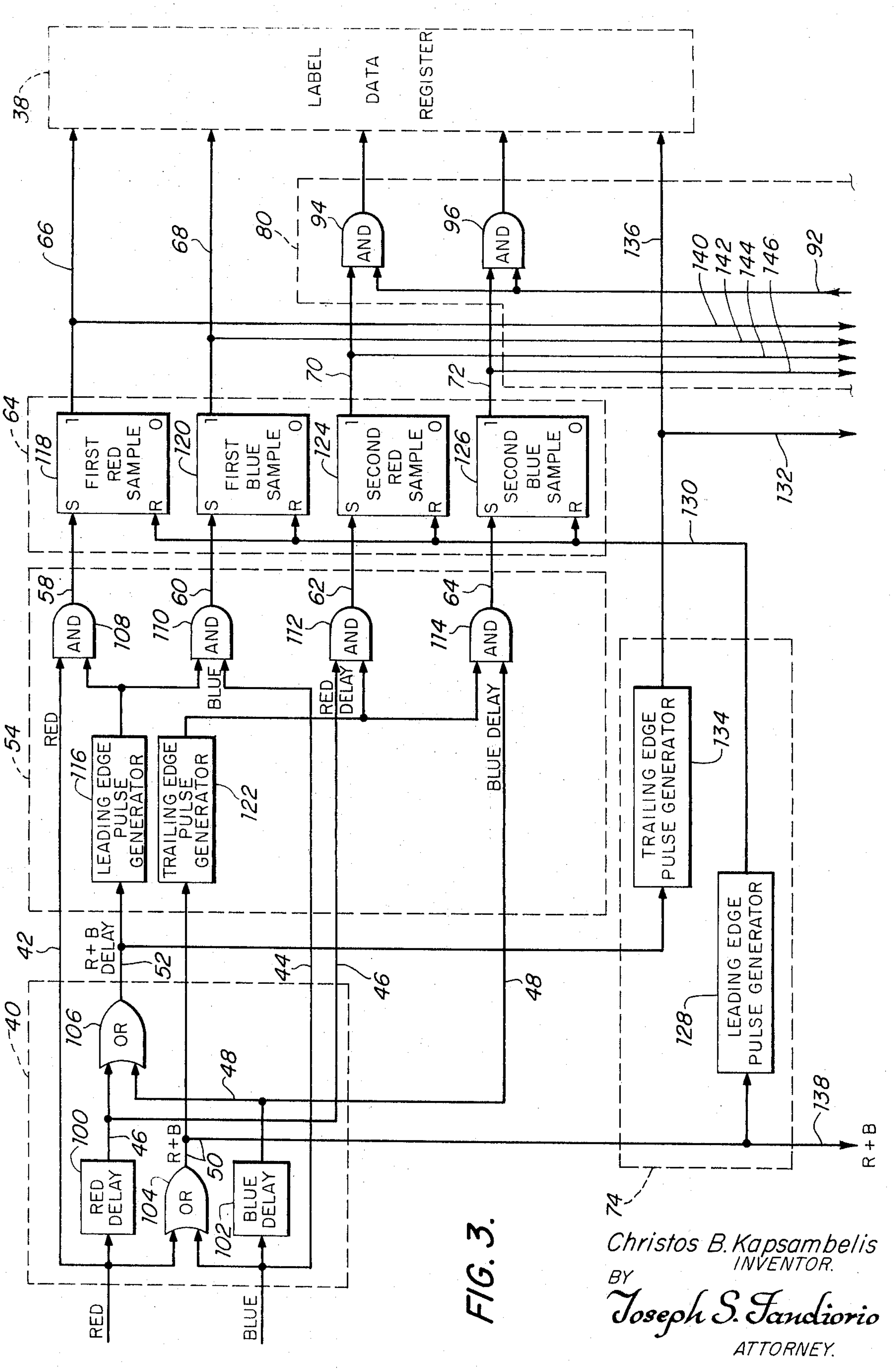
FIG. 3 is a more detailed diagram of the signal generator, sampling circuit, sample store, and shift generator of FIG. 2.

Signal generator 40, sampling circuit 54, sample store 64, shift generator 74 and interconnecting portions of decoder 36 are shown in more detail in FIG. 3. Signal generator 40 receives the red signal from red standardizer 32, transmits the red signal 42, and produces the red delay 46 at the output of red delay circuit 100. Similarly, it receives the blue signal from blue standardizer 34, transmits the blue signal 44, and produces the blue delay signal 48 at the output of blue delay circuit 102. The red and blue signals from standardizers 32, 34 are also supplied to OR circuit 104 to produce the red or blue signal 50 and the red delay 46 and blue delay 48 signals are directed to OR circuit 106 to produce the red or blue delay signal 52. In sampling circuit 54 the red and blue signals 42, 44 are submitted to one input of AND circuits 108, 110 and red delay and blue delay signals 46, 48 are submitted to one input of AND circuits 112, 114. The second input to AND circuits 108, 110 is derived from the red or blue delay signals 52 by leading edge pulse generator 116 to provide the first sample of red and blue signals corresponding to the first band of a stripe. At this time the sample signals representing the presence and absence of red and blue signals in the first band are stored in the first red sample flip-flop 118 and first blue sample flip-flop 120 in sample store 64. The second input to AND circuits 112, 114 is derived from the red or blue signal 50 by trailing edge generator 122 to provide the second sample of red and blue signals corresponding to the second band of a stripe. At this time the sample signals representing the presence and absence of red and blue signals in the second band are stored in the second red sample flip-flop 124 and second blue sample flip-flop 126 in sample store 54.

Shift generator 74, FIG. 3, includes a leading edge pulse generator 128 which in response to the leading edge of a red or blue pulse on line 50 from OR gate 104 delivers a reset pulse on line 130 to reset flip-flop 118, 120, 124, and 126 of sample store 64. Also included in shift generator 74 is trailing edge pulse generator 134 which in response to a red or blue delay signal on line 52 from OR gate 106 produces a transfer pulse on line 136 to label data register 38 to enable the transfer of the information stored in sample store 64 and a reset pulse on line 132 to stripe size determining circuit 80. Shift generator 74 also develops a third pulse by passing unaltered on line 138 the red or blue pulse delivered on line 50 from red or blue OR gate 104. The signals on lines 66, 68, 70 and 72 are delivered to the known width stripe detector 84 in stripe size determining circuit 80 via lines 140, 142, 144, and 146, respectively.

Figure 4:
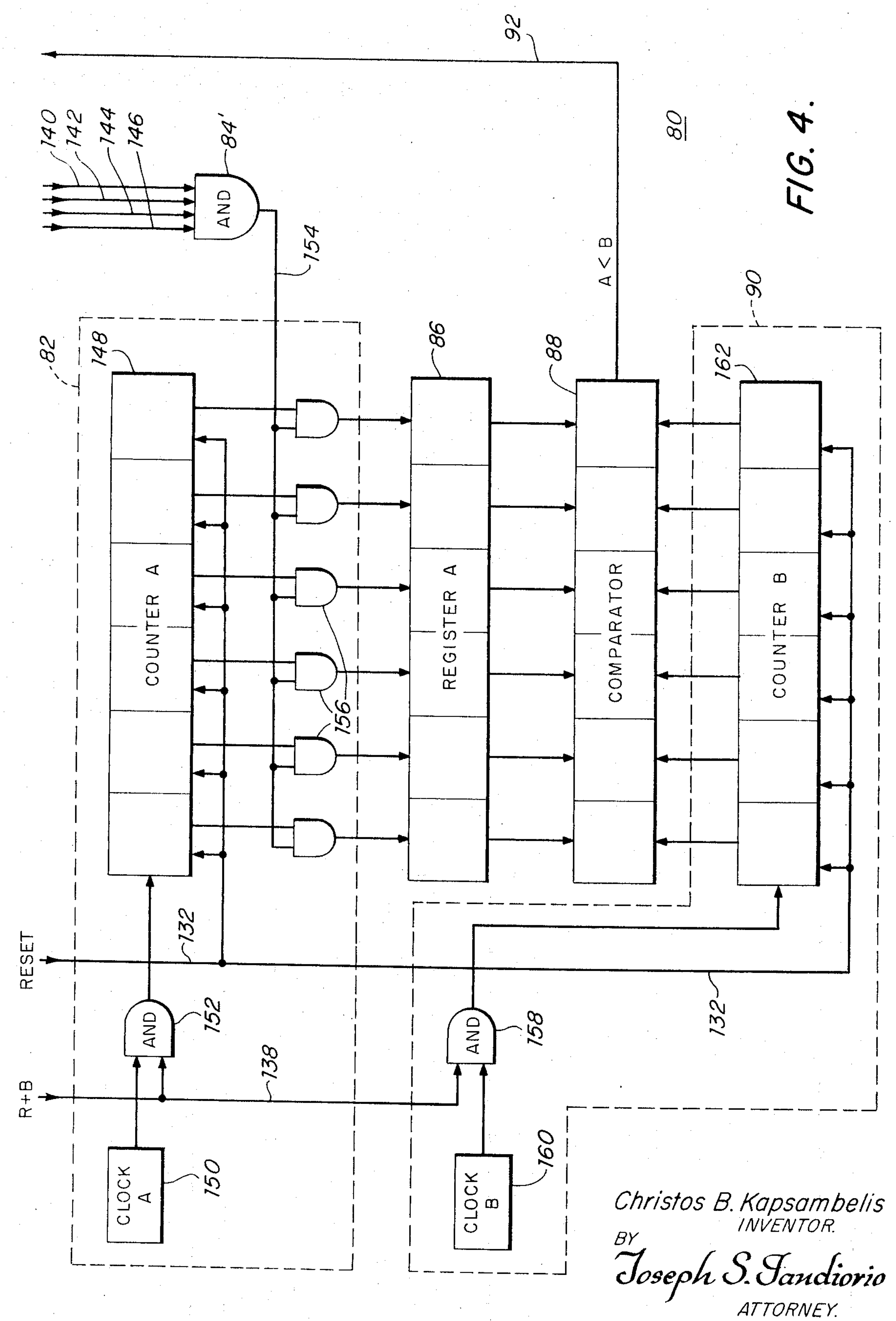
FIG. 4 is a more detailed diagram of the size determining circuit of FIG. 2.

The stripe size determining circuit 80 is illustrated in more detail in FIG. 4 wherein it is shown implemented to use the start stripe, which is a wide stripe consisting of a first red band and second blue band combination, as the reference stripe of known width. In this implementation the known width stripe detector 84 may be a four input AND circuit 84' which provides an output when and only when line 140 reports a red, line 142 reports no blue, line 144 reports no red and line 146 reports a blue which indicates the presence of the start stripe. Known width stripe measuring circuit 82 includes counter A 148 which accumulates the count of pulses produced by clock A 150 that are enabled to pass through AND circuit 152 during the presence of red or blue signals on line 138. Counter A 148 is reset by a signal on line 132 following the end of each red or blue delay signal on line 52, FIG. 3. Upon the recognition by AND circuit 84' that the stripe from which the red or blue signal presently being used to enable the input to counter A 148 is a start stripe, a signal is produced on line 154 to enable AND gates 156 to pass the count accumulated in counter A 148 to storage 86 which may be a register designated A. At the same time that the red or blue signal on line 138 enables AND circuit 152 it also enables AND circuit 158 to pass pulses from clock B 160 to counter B 162. Counter B 162 is also reset following each red or blue pulse following the end of each red or blue delay pulse by a signal on line 132. The clock A 150 has a frequency which is three quarters of that of clock B 160. Therefore, when the system begins to read a label the first stripe encountered, the start stripe, will produce a count in counter A 148 which is three quarters of the value of the count produced by that same start stripe in counter B 162. Thus, immediately after the start stripe has been read, when AND circuit 84' detects the start stripe and enables the transfer of the count in counter A 148 to be made by AND gates 156 to the storage 86, register A, a comparison will be made by the comparator 88. The count accumulated in counter A 148 and now present in register A 86 will be less than the count in counter B and thus comparator 88 will privide a signal on line 92 to enable AND gates 94 and 96 to pass the information pertaining to the second band of the stripe stored in flip-flops 124 and 126 of the sample store 64, FIG. 3. As the scanning of the label continues each of the remaining twelve stripes will produce a red or blue signal which will enable both AND gates 152 and 158 to pass the pulses from their respective clocks 150 and 160 to their respective counters 148 and 162. In each case for the same stripe counter A will accumulate a count which is only three quarters of that accumulated by counter B, but since these stripes cannot be start stripes there is no recognition of a start stripe by AND circuit 84' and thus no signal on line 154 and so the count accumulated in counter A 148 is not transferred to storage 86, register A. Thus the accumulated three quarter count for the initial start stripe remains in storage 86 until a new start stripe is detected by AND circuit 84' at which time the three quarter count for that start stripe will have been accumulated in counter A 148 and will then be transferred to storage 86. Thus each of the succeeding twelve stripes will cause a count to be accumulated in counter B 162 which will be compared with the three quarter count of the original start stripe by comparator 88. Typically each wide stripe in the label will produce a full count in counter B 162 and each narrow stripe will produce one half of that full count. Since these counts accumulated in counter B 162 will be compared with a three quarter count derived from the initial start stripe, there is a tolerance of one quarter of a count in each direction. Thus comparator 88 may determine with relative safety that any time the count in register B 162 is greater than the count in storage 86 there is a wide stripe and any time the count accumulated in counter B 162 is less than the count in storage 86 there is a narrow stripe. This is so because the reference count, i.e. the three quarter count derived from the start stripe is right between the optimum values for the narrow stripe and the wide stripe.

If it is desired to use a stripe other than the start stripe as the reference stripe, then more storage capacity is required so that all of the stripes measured before the reference stripe may be stored and read out for comparison after the reference stripe has been measured. Typically this would be the case if the stop stripe were decided upon as the reference stripe. Similarly this technique may be used to distinguish more than one size by having a more detailed comparison than the simple greater than or less than determination made by comparator 88. Similarly this size determining circuit is not limited to use with the A.A.R. system or with a vertical array of horizontal stripes or with stripes of any sort. It may as well be used with to determine the size in at least one direction of any section of information which is included in a group of such sections of information one of which sections in that group is of a known size.

The method and apparatus of this invention may be accomplished using a number of different machines such as special purpose computers and alternatively may be accomplished by a general purpose computer properly programmed to practice the method of this invention.

Other embodiments will occur to those skilled in the art and are within the following claims:

What is claimed is:

1. In an automatic reading system for reading a remote label containing coded information in the form of a plurality of stripes which may include wide stripes and narrow stripes, a stripe width determining circuit comprising:

detector means for recognizing a specific code contained in a stripe whose width is known;

first encounter means; a first source of clock signals occurring at a first clock rate; and first gating means for gating said clock signals at said first rate to said first counter during the interval of a stripe;

second counter means; a second source of clock signals occurring at a second clock rate different than said first rate and second gating means for gating said clock signals at said second rate to said second counter during the interval of a stripe whose width is to be determined;

storage means, third gating means, responsive to a recognition of said specific code by said detector means, for transferring to said storage means the count accumulated in said first counter means; and comparator means for comparing the accumulated count in said storage means with the accumulated count in said second counter means and producing a first output if the former exceeds the latter and a second output if the latter exceeds the former.

2. The stripe width determining circuit of claim 1 in which said first source of clock signals produces clock signals at a slower rate than said second source of clock signals.

3. The stripe width determining circuit of claim 1 in which said detector means recognizes a wide stripe.

4. The stripe width determining circuit of claim 1 in which said detector means includes an AND gate for recognizing the code contained in the first stripe of known width on the label.

5. A method of automatically reading a remote label containing coded information in the form of a plurality of stripes which may include wide stripes and narrow stripes comprising:

detecting a specific code contained in a stripe whose width is known;

counting signals occurring at a first rate during the interval of a stripe;

counting signals occurring at a second rate different from the first rate during the interval of a stripe;

storing the first count if the stripe occurring in that interval has been recognized as the specified code contained in a stripe whose width is known;

comparing the second count and the count stored to determine which is larger; and producing a first output if the second count is larger and a second output if the stored count is larger.

* * * * *